United States Patent [19]
Deckler

[11] Patent Number: 5,697,455
[45] Date of Patent: Dec. 16, 1997

[54] ADJUSTMENT MECHANISM FOR ROW UNIT ACCESSORY

[75] Inventor: Harry C. Deckler, Williamsburg, Iowa

[73] Assignee: Kinze Manufacturing, Inc., Williamburg, Iowa

[21] Appl. No.: 661,307

[22] Filed: Jun. 13, 1996

[51] Int. Cl.$^6$ ............................................. A01C 5/06
[52] U.S. Cl. ............................. 172/624.5; 111/85
[58] Field of Search ........................ 111/52, 140, 85, 111/189, 195, 924; 172/140, 145, 156, 166, 624, 624.5; 56/15.2, 15.7

[56] References Cited

U.S. PATENT DOCUMENTS

| | | |
|---|---|---|
| 617,454 | 1/1899 | Whittier . |
| 2,826,133 | 3/1958 | Moss . |
| 3,173,498 | 3/1965 | Heilbrun . |
| 3,362,361 | 1/1968 | Morrison, Jr. . |
| 4,278,036 | 7/1981 | Buchele . |
| 4,295,532 | 10/1981 | Williams . |
| 4,377,979 | 3/1983 | Peterson . |
| 4,425,973 | 1/1984 | Williams . |
| 4,430,952 | 2/1984 | Murray . |
| 4,483,401 | 11/1984 | Robertson . |
| 4,585,073 | 4/1986 | Mayeda . |
| 4,623,024 | 11/1986 | Suhlenker ............. 172/624.5 X |
| 4,660,653 | 4/1987 | Mayeda . |
| 4,691,645 | 9/1987 | Anderson . |
| 4,738,316 | 4/1988 | Wood . |
| 4,785,890 | 11/1988 | Martin . |
| 4,840,020 | 6/1989 | Oka ........................... 56/15.2 |
| 4,846,084 | 7/1989 | Sigle ..................... 172/624.5 X |
| 4,974,683 | 12/1990 | Hanig et al. .......... 172/624.5 X |
| 5,076,180 | 12/1991 | Schneider . |
| 5,129,282 | 7/1992 | Bassett . |
| 5,398,771 | 3/1995 | Hornung et al. ...... 172/624.5 X |

OTHER PUBLICATIONS

Deere Parts Manual, pp. A02, D22 and D23 (Sep. 1987).
Deere Flexi–Planter Operating Manual #OM–H135752, issue D8, pp. 35–11 and 35–12 (no date).
Deere advertisement for 71 Flexi–Planter units (Sep. 1995).
Martin & Co. literature for Bar Float Bracket Model BF–25 (Mar. 1995).
Martin & Co. literature for Frame Mount Coulter Row Cleaner, Model WFM113 and Spading Closing Wheel Model SCW–51 (Sep. 1995).
Martin & Co. literature for Moveble Axle Row Cleaner, Model 1317 (Sep. 1995).
Martin & Co. literature for Original Row Cleaner, Model 1330 (Sep. 1994).
Martin & Co. literature for Original Row Cleaner, Model 1516 (Sep. 1995).
Martin & Co. literature for Spading/Closing Wheel Model SCW70/72 (Sep. 1995).
Martin & Co. literature for Spading/Closing Wheels Model SCW–75 (Sep. 1995).
Martin & Co. literature for Spading/Closing Wheels Model SCW–89 (Sep. 1995).
Martin & Co. literature for Wrap Around Row Cleaner, Model C125 (4 pgs.) (Sep. 1995).
Drawing for mounting for Martin Original Row Cleaner (Sep. 1994).
Yetter catalog pp. 16–17 for Residue Manager Combination (no date).

*Primary Examiner*—Randolph A. Reese
*Assistant Examiner*—Robert Pezzuto
*Attorney, Agent, or Firm*—Emrich & Dithmar

[57] ABSTRACT

An adjustment mechanism for an agricultural row unit accessory, such as residue wheels for a planter row unit, includes an assembly for mounting the residue wheels in front of a leading coulter on the row unit. A cam, mounted to the residue wheel assembly for quick and reliable angular adjustment, engages a support arm for the coulter wheel. By rotating the cam, the operating height of the residue wheels is quickly and easily adjusted, while leaving the residue wheels free to rise if they encounter an obstruction.

7 Claims, 4 Drawing Sheets

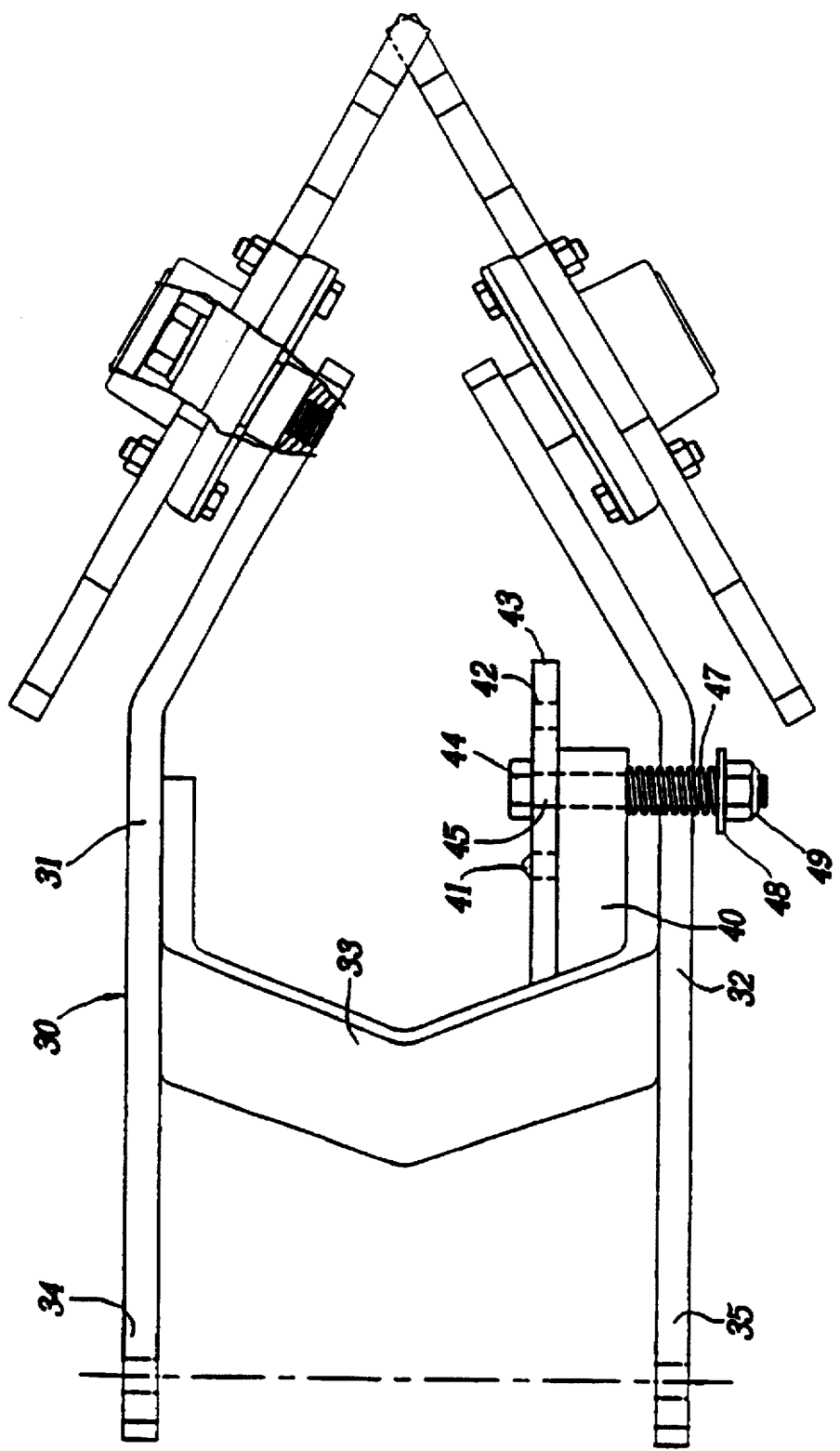

ADJUSTMENT MECHANISM FOR ROW UNIT ACCESSORY

FIELD OF THE INVENTION

The present invention relates to agricultural row crop implements; and more particularly to an improved apparatus for adjusting the operating depth of a row unit accessory, such as disc furrowers, residue wheels, bed levelers and the like. The invention is illustrated and explained in connection with a row unit of a row crop planter, but may be used with other implements such as cultivators.

BACKGROUND OF THE INVENTION

Currently, attachments for use on the front of planter row units, such as residue wheels, disc furrowers, and bed levelers may be adjusted for operating depth by adjusting bolts or set screws which requires the use of wrenches or other tools, or which employ removable pins or the like which can be dropped or lost. For example, a vertical telescoping assembly has the outer, upper telescoping leg mounted to the planter frame, and the residue wheels are attached to the lower end of the lower, inner telescoping member. The two telescoping members have a series of aligned apertures through which a bolt is placed (secured by a nut) to achieve vertical adjustment once the proper set of apertures in the lower telescoping member are aligned with the desired set of apertures in the upper telescoping member, depending upon the desired height of adjustment.

A second known mechanism uses telescoping square rods which do not rotate relative to one another, and with a threaded rod received in a threaded engagement with one of the two telescoping member and fixed relative to the other, so that turning the rod adjusts the extend to which the tubes telescope, and thus the height of the movable tube which, in turn, carries the device being adjusted. This device requires a substantial amount of hand turning to go through a full range of adjustment, and it is expensive to manufacture and subject to having the threads jammed after field use.

SUMMARY OF THE INVENTION

The present invention provides an adjusting mechanism for an agricultural row unit accessory, such as residue wheels for a planter row unit. It includes an assembly for mounting the residue wheels in front of the row unit (to a forward coulter, in the illustrated embodiment).

A cam is mounted to the adjustable assembly, and includes a cam surface which is arranged to engage a member connected to the frame. The assembly itself is pivotally connected to the frame so that it may freely rise and fall about a horizontal axis, but the assembly is limited in its downward motion when the cam surface engages the limit stop member, which in the case of the illustrated embodiment is one of the support arms for the leading coulter on the row unit.

By moving the cam along its axis and rotating it, an adjusting aperture on the cam is aligned with a fixed pin to adjust the operating height of the residue wheels quickly, reliably, and easily. The mechanism leaves the residue wheels free to rise if they encounter an obstruction in the ground. In other words, the residue wheel assembly is biased to the use position only by the weight of the assembly itself, but it is free to rise to clear obstructions.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 5 is a top view of the adjustable residue wheel assembly.

DETAILED DESCRIPTION OF A PREFERRED EMBODIMENT

Figure 1:
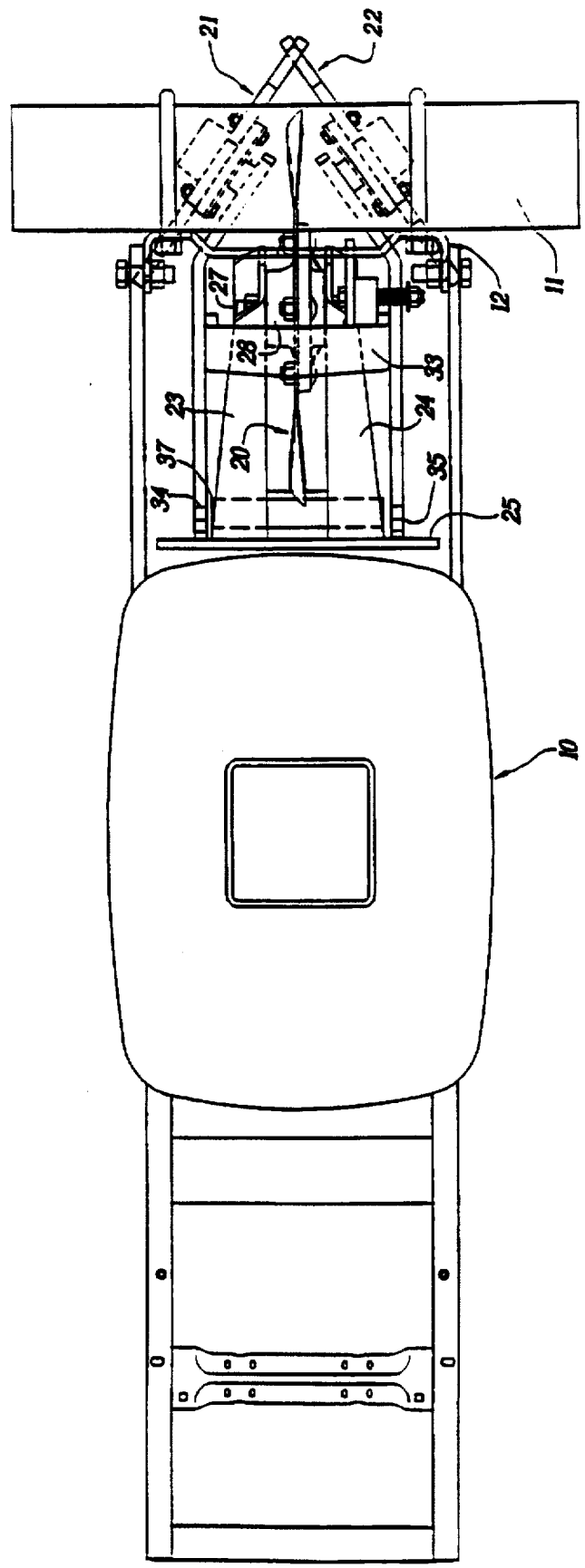
FIG. 1 is a top view of a planter row unit incorporating the invention.
Figure 2:
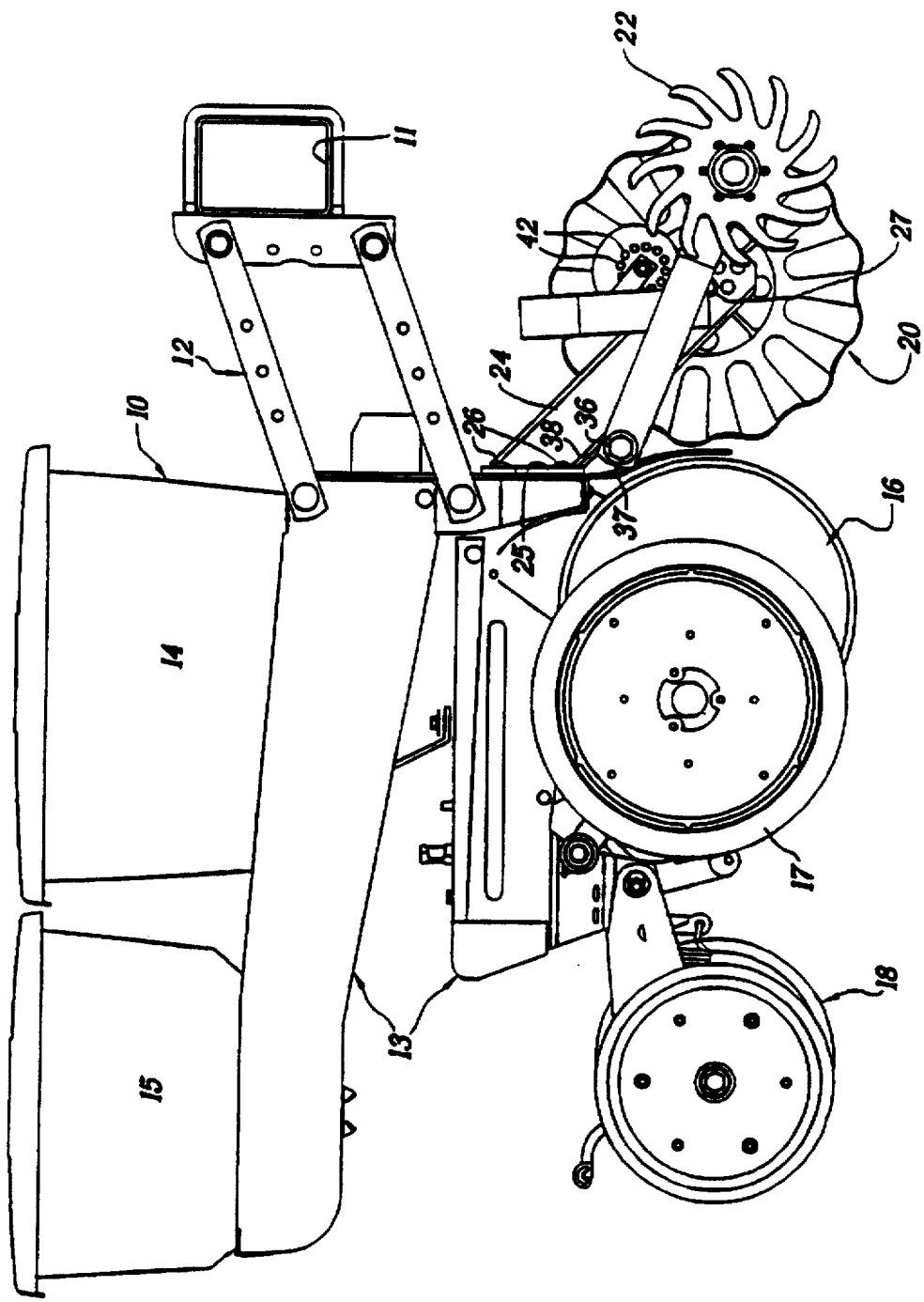
FIG. 2 is a right side view of the row unit of FIG. 1.

Referring first to FIGS. 1 and 2, a planter row unit 10 is mounted to an implement frame or toolbar 11 by a conventional four-bar linkage 12 (only partly shown in FIG. 1). The row unit includes a frame 13 which carries hoppers 14, 15. Also mounted to the lower section of frame 13 are a pair of furrow-opening discs (one of which is seen in FIG. 2 and designated 16), a pair of depth gauge wheels (the one shown in FIG. 2 is designated 17), and a pair of furrow closing wheels, one being shown at 18.

As is known, seed is stored in hopper 14, fed to and "singulated" by a meter (not shown) and deposited at desired spacing in the furrow formed by the double disc opener and gauge wheels. The furrow is then closed and soil packed about the seed by the closing wheels 18.

Current farming practices recognize that some residue from prior crop, if left on the surface, is beneficial. However, particularly in the case of corn, surface residue may make planting difficult the next season, so it is desirable to make provision on each row unit for handling surface residue. In the illustrated embodiment, a fluted coulter 20 is aligned with the center of, and located in front of the disc opener; and a pair of residue wheels 21, 22 are arranged on axes inclined at acute angles relative to the direction of travel and in slightly overlapped relation, best seen in FIG. 1. The free-wheeling residue wheels act to clear large residue by moving it to the side, and the coulter cuts residue straddling the strip in which the furrow is being formed. The toolbar, of course, is mounted to a tractor, and is pulled to the right, as viewed in FIGS. 1 and 2.

The coulter 20 is mounted in the center of the row unit by left and right support arms 23, 24 which are welded to a mounting plate 25 which, in turn, is mounted by bolts 26 directly to the row unit frame 13. An axle bolt 27 mounts hub 28 with its bearings (not shown) to the forward ends of the support arms 23, 24 in a conventional manner.

The residue wheels 21, 22 are part of a unitary assembly 30, seen in FIG. 5. The residue wheel assembly 30 includes left and right support arms 31, 32 which are connected together by an overhead transverse bracket 33. The rear ends of the arms are provided with apertures 34, 35 which are aligned for receiving a pivot pin or shaft 36. Pin 36 is received in a bushing or sleeve 37 welded to a plate 38 which, in turn, is welded to the bottoms of the coulter support arms 23, 24. Thus, the residue wheel assembly is free to pivot, as a unit, up and down about pivot pin 36. Gravity urges the residue wheel assembly toward the lower, working position seen in FIGS. 2-5, but the residue wheel assembly is free to raise upwardly and ride over obstructions. As may be observed from FIGS. 3–5, the transverse bracket 33 has the general shape of an inverted U. The center portion has a broad, inverted chevron shape for straddling the coulter 20 and its support arms 23, 24, as well as the coulter itself.

Figure 4:
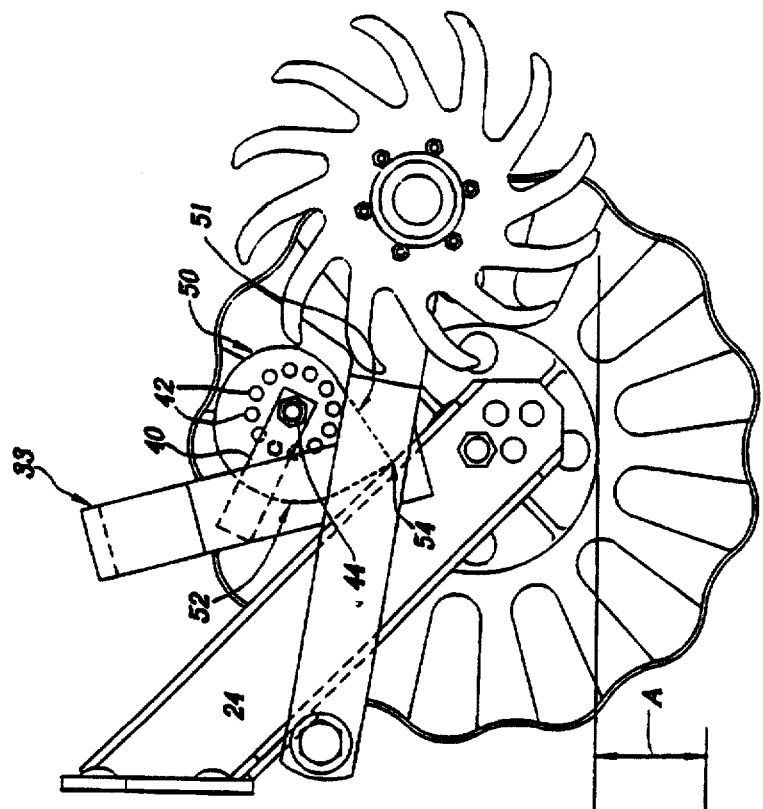
FIGS. 3 and 4 are close-up side views similar to FIG. 2, showing the residue wheels adjusted respectively to the deepest and the most shallow operating depths at the limits of the adjustment range.

A support arm 40 is welded to the inner surface of the right leg of the bracket 33, and as best seen in FIGS. 4 and 5, the arm 40 extends forwardly of the bracket 33. A pin 41 (FIG. 5) is set in, and extends to the left of the bracket 40. Pin 41 is received in one of a plurality of apertures 42 which are formed in a cam member 43. A bolt 44 forming a pivot shaft has its head welded to the left side of the cam member 43, and extends through an aperture 45 in the cam member 43. The centers of adjustment apertures 42 are equally angularly spaced about the center of aperture 45 (i.e., the axis of rotation of the cam member), through equal spacing is not necessary.

The pivot shaft 44 extends through a corresponding aperture in the cam support arm 40, and a coil spring 47 is received on the bolt 44 to the right of the support arm 40. A washer 48 and a nut 49 are provided on the right end of the pivot shaft 44 for retaining the spring 47 and for applying a controlled, preload compression to the spring 44. It will be apparent to persons skilled in the art that the structure just described provides a bias transmitted through the head of the bolt 44 to urge the cam member 43 towared the right in FIG. 5 so that the pin 41 on the support arm 40 remains engaged in one of the adjustment apertures 42 selected by the operator for controlling depth, as will now be described.

Figure 3:
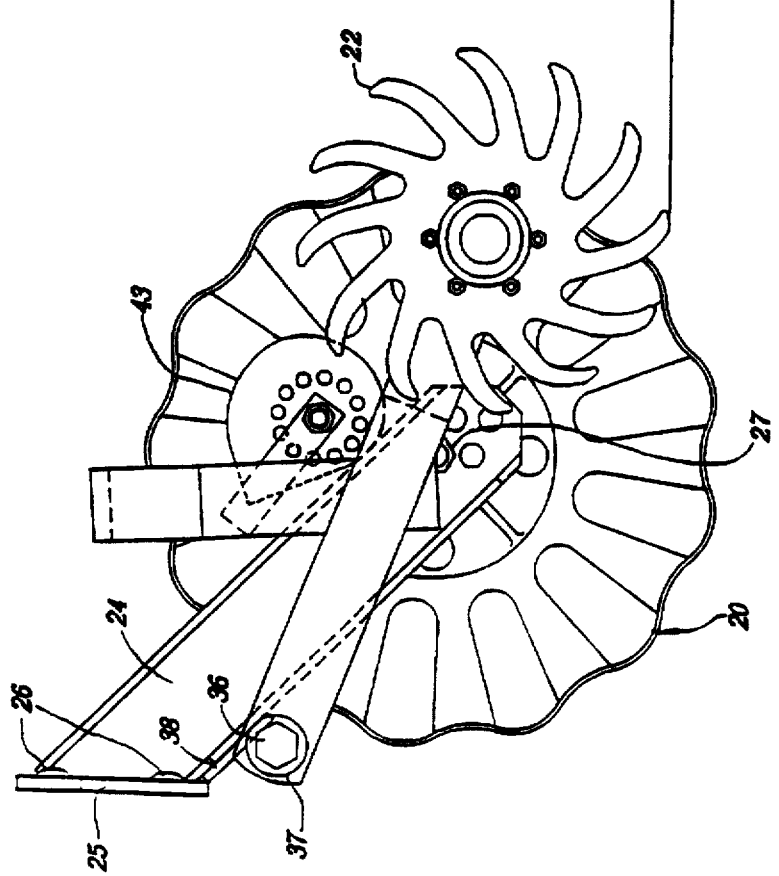

As best seen in FIGS. 3 and 4, the cam 43 includes a peripheral cam surface 50 which has a generally flat section 51 and a curved portion 52 which extends from the right side of the flat section 51 about the center of the pivot shaft 44 with progressively increasing distance from the center of the pivot shaft 44, to a point 54 defining the left or "far" side of the flat section 51.

The cam member 43 may be rotated about the axis of the pivot member 44 (which is journalled in the support arm 40) by moving the cam plate to the left as seen in FIG. 5, thereby disengaging the pin 41 from the selected adjustment aperture 42. When this occurs, the cam is free to be rotated by hand. To facilitate rotation, the entire residue wheel assembly may be raised by bracket 33, pivoting the assembly about the axis of pivot 36. The desired adjustment aperture 42 is then aligned with the pin 41, and the pin 41 is seated in the aperture corresponding to the desired operating depth by releasing the cam member. That is, the spring 47 urges the pivot shaft 44 back toward the right, seating the pin 41 in the selected aperture 42.

As best seen in FIG. 1, the outer surface of the cam 43 (namely, the cam surface 50) is aligned to engage an upper flange of the support arm 24 for the coulter 20. The support arms 23, 24 for the fluted coulter 20 are rigidly mounted to the frame of the row unit, and the residue wheel assembly is free to rotate about pivot shaft 36. Thus, as the residue wheel assembly is lowered following an adjustment, the outer surface 50 of the cam 43 engages the upper surface of the flange of support arm 24, as seen in FIGS. 3 and 4.

The variable distance between the axis of the pivot 44 for the cam, and the outer cam surface 50 sets the operating height of the residue wheels relative to the frame of the row unit or the surface of the soil, since the row unit itself is fixed in height relative to the surface of the soil. In other words, the height of the residue wheels is adjustable over a continuous range relative to the operating depth of the fluted coulter, twin-disc opener, gauge wheels, and closing wheels of the row unit. The range of adjustment for the residue wheels is illustrated by the arrow A which compares the operating depth of the residue wheels in the lower limit of the adjustment range (FIG. 3) where the flat portion 51 of the cam surface engages the support arm for the coulter, and the operating depth in the upper limit of the adjustment range (FIG. 4) where the point 54 of the cam surface engages the coulter support arm.

By comparing FIGS. 3 and 4 it will be seen that in FIG. 4 the residue wheels are shown in the highest setting and in FIG. 3 they are at the lowest operating setting. The differences between the two settings is a range of adjustment defined by the shape of the cam surface 50.

Thus, the height of the residue wheels is quickly, easily, reliably and independently set by a simple mechanism not requiring the use of any special tools, but providing reliable and easily changed adjustment, while leaving the residue wheel assembly free to rise to clear any obstruction encountered.

Having thus disclosed in detail a preferred embodiment of the invention, persons skilled in the art will be able to modify certain of the structure which has been illustrated and to substitute equivalent elements for those disclosed while continuing to practice the principle of the invention. For example, it will be observed that the cam 43 is mounted to, and carried by the residue wheel assembly, and engages the support arm for the coulter in defining the adjusted use position of the residue wheels. Persons skilled in the art will appreciate that the cam equally well could be mounted to the support arm for the coulter or to the row unit frame directly, and adapted to engage the frame of the residue wheel assembly. It will also be appreciated that the support arms for the coulter are rigidly mounted to the row unit frame, and thus an extension of, and an integral part of the row unit frame for purposes of the present invention. Further, whereas the adjustment apertures are on the cam and the projection is mounted on the support arms for the coulter (i.e., the row unit frame), these locations could be reversed. It is, therefore, intended that all such modifications and substitutions be covered as they are embraced within the spirit and scope of the appended claims.

I claim:

1. In combination with an agricultural row unit having a frame, comprising:

a first ground-engaging tool having a support mounted to said row unit frame and extending in front of said row unit frame;

an accessory frame carrying a second ground-engaging tool and pivotally mounted for movement between a use position at which said accessory frame rests on said support of said first tool while permitting said second tool to work the ground in front of said first tool and allowing said second tool to rise above said use position during operation;

a cam having an axis of rotation and including a cam surface extending at least partially about said axis of rotation at a variable distance, said cam being adjustable by axial movement and then rotation about said axis of rotation to an adjusted position; and means for mounting said cam to one of said support and said accessory frame such that said cam surface is positioned to engage the other of said support and said accessory frame to limit the downward movement of said second tool, said cam surface engaging the other of said support and accessory frame when adjusted, thereby to define the use position of said second tool relative to said first tool.

2. The apparatus of claim 1 wherein said cam is mounted on said accessory frame means for rotation about a generally horizontal axis, and wherein said cam surface is adapted to engage said support.

3. The apparatus of claim 1 wherein said accessory frame means includes a support bracket carrying said cam; said projection being integral with said support bracket, said cam defining a plurality of angularly spaced adjustment apertures, said cam including a shaft supported by said support bracket and constructed and arranged such that a selected one of said adjustment apertures is located to engage said projection when said cam is moved axially of said cam shaft and rotated; and spring biasing means for urging said cam into engagement with said support bracket such that when said projection is aligned with one of said adjustment apertures, said cam and said support bracket will remain engaged under the biasing action of said spring biasing means.

4. The apparatus of claim 3 wherein said cam surface of said cam is characterized as having a progressively increasing distance from the axis of rotation of said cam when proceeding about said' surface from a first location defining one limit of a depth adjustment range of said tool, to a second position defining a second limit of the depth adjustment range of said tool.

5. The apparatus of claim 4 wherein said cam surface is further characterized as having a flat portion defining one limit position of the adjustment range of the use position of said tool.

6. The apparatus of claim 5 wherein said second tool comprises first and second support arms, a bracket interconnecting said support arms to form an accessory frame, said apparatus further comprising means for pivotally mounting said accessory frame to said row unit frame for pivotal rotation about a horizontal axis transverse of the direction of travel of said row unit; and first and second residue wheels rotatably mounted respectively to the forward ends of said support arms.

7. In a device for adjusting a use position of an accessory adapted for use in an agricultural row unit, said accessory including a frame, the improvement comprising:

means for pivotally mounting said accessory frame to be carried by said row unit frame for rotation about a horizontal axis between a use position of predetermined, adjusted height relative to the soil surface when said row unit is in field use, and a raised position when said tool is located at a second position relative to said soil surface;

a cam rotatably carried on a shaft mounted to one of said accessory frame and said row unit frame and adapted to engage the other of said accessory frame and said row unit frame to limit the vertical position of said accessory frame relative to said row unit frame;

projection means on one of said accessory frame and said cam;

a plurality of adjustment apertures on the other of said cam and said accessory frame; and spring means for resiliently biasing said cam axially of said shaft such that said projection means engages one of said adjustment apertures, whereby said cam may be moved axially of said shaft, thereby disengaging one adjustment aperture and said projection means, and permitting said cam to be rotated to align another of said adjustment apertures with said projection means whereupon when said cam is released, said spring means will move said cam axially and said projection means will engage the newly selected adjustment aperture and define the new use position of said accessory frame.

* * * * *